United States Patent
Tevemark (10) Patent No.: US 10,050,794 B2
(45) Date of Patent: Aug. 14, 2018

(54) METHOD PERFORMED AT AN IP NETWORK NODE FOR IPSEC ESTABLISHMENT

(71) Applicant: Telefonaktiebolaget LM Ericsson (publ), Stockholm (SE)

(72) Inventor: Jonas Tevemark, Vikingstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 196 days.

(21) Appl. No.: 15/024,754

(22) PCT Filed: Sep. 30, 2013

(86) PCT No.: PCT/SE2013/051131
§ 371 (c)(1),
(2) Date: Mar. 24, 2016

(87) PCT Pub. No.: WO2015/047143
PCT Pub. Date: Apr. 2, 2015

(65) Prior Publication Data
US 2016/0234028 A1    Aug. 11, 2016

(51) Int. Cl.
*H04L 29/06* (2006.01)
*H04L 9/32* (2006.01)
(Continued)

(52) U.S. Cl.
CPC ......... *H04L 9/3263* (2013.01); *H04L 9/0838* (2013.01); *H04L 63/0823* (2013.01);
(Continued)

(58) Field of Classification Search
CPC . H04L 2209/64; H04L 45/04; H04L 63/0272; H04L 63/0823; H04L 63/164; H04L 63/20; H04L 9/0838; H04L 9/3263
See application file for complete search history.

(56) References Cited

U.S. PATENT DOCUMENTS 7,234,063 B1 * 6/2007 Baugher ............... H04L 9/0833
380/259
7,486,659 B1 * 2/2009 Unbehagen ......... H04L 12/4633
370/351
(Continued)

FOREIGN PATENT DOCUMENTS

CA       2680599       12/2009
WO   WO 2008/092351 A1   8/2008

OTHER PUBLICATIONS

Bonatti, Chris, S. Turner, and G. Lebovitz. Requirements for an IPsec Certificate Management Profile. No. RFC 4809. 2007. (Year: 2007).*

(Continued)

*Primary Examiner* — Michael Simitoski
(74) *Attorney, Agent, or Firm* — Baker Botts, LLP (57) ABSTRACT

The present invention relates to a method (500) performed at an IP network node for IPSec establishment with other IP network nodes in a network. The method comprises collecting (S1) information about the other IP network nodes in the network using a dynamic routing protocol, the information comprising an IP address associated with the respective other IP network node, and establishing (S2) an IPSec relationship with a predetermined set of the other IP network nodes in the network based on the collected information and based on Internet Key Exchange (IKE) using a certification protocol and the identity of the IP network node, wherein the identity of the IP network node is determined by a pre-stored node certificate.

21 Claims, 6 Drawing Sheets

(51) Int. Cl.
*H04L 9/08* (2006.01)
*H04L 12/28* (2006.01)
*H04L 12/715* (2013.01)

(52) U.S. Cl.
CPC ............ *H04L 63/164* (2013.01); *H04L 63/20* (2013.01); *H04L 45/04* (2013.01); *H04L 63/0272* (2013.01); *H04L 2209/64* (2013.01)

(56) References Cited

U.S. PATENT DOCUMENTS

| | | | | |
|---|---|---|---|---|
| 8,458,453 | B1* | 6/2013 | Mahalingaiah | H04L 12/462 713/153 |
| 2003/0069973 | A1* | 4/2003 | Ganesan | H04L 29/06 709/226 |
| 2003/0179742 | A1* | 9/2003 | Ogier | H04L 1/1614 370/351 |
| 2003/0233576 | A1* | 12/2003 | Maufer | H04L 29/06 709/226 |
| 2004/0088646 | A1* | 5/2004 | Yeager | H04L 29/06 715/229 |
| 2004/0133798 | A1* | 7/2004 | Swander | H04L 63/1458 726/14 |
| 2006/0167894 | A1 | 7/2006 | Wunner | |
| 2006/0294363 | A1* | 12/2006 | Bae | H04L 63/0272 713/153 |
| 2007/0195728 | A1* | 8/2007 | Chen | H04L 45/00 370/328 |
| 2007/0283412 | A1* | 12/2007 | Lie | H04L 63/20 726/1 |
| 2008/0052756 | A1* | 2/2008 | Morishige | H04L 63/0227 726/1 |
| 2009/0106449 | A1 | 4/2009 | Satterlee et al. | |
| 2009/0175194 | A1* | 7/2009 | Akhter | H04L 41/0803 370/254 |
| 2011/0228935 | A1* | 9/2011 | Fukunaga | H04L 9/0844 380/255 |
| 2014/0198794 | A1* | 7/2014 | Mehta | H04L 45/74 370/392 |

OTHER PUBLICATIONS

Ghosh, Abhrajit, et al. "Securing ad-hoc networks using IPsec." Military Communications Conference, 2005. MILCOM 2005. IEEE. IEEE, 2005. (Year: 2005).*
Gupta, M., and N. Melam. Authentication/confidentiality for OSPFv3. No. RFC 4552. (Year: 2006).*
Laguidi, Ahmed, Aawatif Hayar, and Michelle Wetterwald. "Secure HeNB network management based VPN IPSec." Next Generation Networks and Services (NGNS), 2012. IEEE, 2012. (Year: 2012).*
Moy J: "OSPF Version 2", RFC 1247, Internet Engineering Task Force, IETF—Jul. 1, 1991.
Supplemental European Search Report for Application No. EP 13 89 4468—dated Aug. 18, 2016.
Bonatti C. et al.: "Requirements for an IPsec Certificate Management Profile", RFC 4809, Internet Engineering Task Force, IETF—Feb. 1, 2007.
EPO Communication Pursuant to Article 94(3) EPC for Application No. 13 894 468.1-1853—dated Aug. 29, 2016.
PCT International Search Report for International application No. PCT/SE2013/051131, dated Jun. 3, 2014.
PCT Written Opinion of the International Searching Authority for International application No. PCT/SE2013/051131, dated Jun. 3, 2014.
Internet Key Exchange Protocol Version 2 (IKEv2) by C. Kaufman et al.; Internet Engineering Task Force (IETF), Request for Comments: 5996; ISSN: 2070-1721, Sep. 2010.
"Internet X.509 Public Key Infrastructure Certificate and Certificate Revocation List (CRL) Profile" by D. Cooper; Network Working Group, Request for Comments: 5280, May 2008.
OSI IS-IS Intradomain Routing Protocol by David Oran, Editor, Digital Equipment Corp.; Network Working Group, Feb. 1990.
"OSPF for IPv6" by R. Coltun et al.; Network Working Group, Request for Comments: 5340, Jul. 2008.
"OSPF Version 2" by J. Moy, Ascend Communications, Inc.; Network Working Group; Request for Comments: 2328; STD: 54, Apr. 1998.
"Security Architecture for the Internet Protocol" by S. Kent et al.; Network Working Group; Request for Comments: 4301, Dec. 2005.

* cited by examiner

Fig 8

METHOD PERFORMED AT AN IP NETWORK NODE FOR IPSEC ESTABLISHMENT

PRIORITY

This nonprovisional application is a U.S. National Stage Filing under 35 U.S.C. § 371 of International Patent Application Serial No. PCT/SE2013/051131, filed Sep. 30, 2013, and entitled "A Method Performed At An IP Network Node For IPSec Establishment".

TECHNICAL FIELD

The present invention relates to a method performed at an IP network node for IPSec establishment with other IP network nodes in a network.

The present invention further relates to an IP network node for an IP network. In particular, the present invention relates to an IP network node having processing means for establishing an IPSec relationship with other nodes in the network.

The present invention also relates to a radio base station comprising an IP node for an IP network.

The present invention also relates to a network comprising a plurality of IP network nodes.

BACKGROUND

Today there exists solutions for automatically establish IPsec (Internet Protocol Security) relations between nodes as long as the IP addresses of the nodes and their interfaces in question are known in advance. The IP addresses can also be pre-configured in an intermediate transport network and provided upon request from nodes, which are in process of establishing IPsec relations. A DHCP (Dynamic Host Configuration Protocol) can be used to provide this type of information upon request. The IP addresses can therefore be provided using options in the DHCP.

The nodes involved in an IPsec relationship setup need to have individual node certificates. The individual node certificates are issued by a Certificate Authority (CA) of a public key infrastructure (PKI). The individual node certificates are signed by the CA. Further, the nodes involved in an IPsec relationship setup need also to have one or a plurality of root certificates of the CA in order to be able to verify the correctness of the individual certificates of different nodes.

An Internet Key Exchange (IKE) protocol handles authentication of the nodes using the above certificates. The IKE protocol further generates and updates IPsec session keys for the relations and establishes the actual IPsec relations (tunnels).

The IP addresses of the involved nodes, or at least for one of the nodes (e.g. a centralized security gateway), need to be known in advance or pre-configured in some of the nodes before IPsec relations can be established. This might be a problem since the IP iddresses are not permanent and may change over time. For example, IP addresses IP addresses may be dynamically allocated to IP nodes from an address pool. Further, this might also be a problem since when creating meshed IPsec relations in networks with a large quantity of IP nodes, this requires a lot of pre-configuration on each and every IP node. This might be a problem when mitigating between different versions of the IP protocol.

SUMMARY

One object is to provide an improved way of IP Security (IPsec) establishment between IP network nodes.

This has in one embodiment been achieved by means of a method performed at an IP network node for IPsec establishment with other IP network nodes in a network. The method comprises steps of collecting information about the other IP network nodes in the network and establishing an IPSec relationship with a predetermined set of the other IP network nodes in the network.

The step of collecting information about the other IP network nodes in the network is performed using a dynamic routing protocol. The collected information comprises an IP address associated with the respective other IP network node.

The step of establishing an IPsec relationship with a predetermined set of the other IP network nodes in the network is performed based on the collected information and based on Internet Key Exchange (IKE) using a certification protocol and the identity of the IP network node. The identity of the IP network node is determined by a pre-stored node certificate.

One advantage of this method is that a configuration burden when setting up IPsec relationships between nodes is minimized. The IP nodes only need to have access to a dynamic routing protocol and node certificate information in order to set up IPsec relationships. No or limited pre-configuraton of the IP nodes is required.

Further, IP addresses need not be known in advance. This is advantageous as IP addresses are not always known in advance e.g. when dynamically allocating IP addresses to IP nodes from an address pool. IP addresses are not permanent, and may change over time The method for IPSec establishment with other IP network nodes in a network is decentralized as each IP network node may be arranged to perform the method for IPSec establishment with other IP network nodes without central control.

Further, as each node in the network may set up IPsec relationships, secure transmission may be provided with nodes outside the predetermined set of other IP network nodes using a plurality of IP sec relationship tunnels.

In one option, the dynamic routing protocol is an Interior Gateway Protocol (IGP).

In one option, the information about the respective other IP network node comprises the IP address of the other IP network node itself and/or an interface associated thereto.

In one option, the step of establishing the IPSec relationship further comprises
  sending a request for establishment of an IPSec relationship to at least one of the IP network nodes in the predetermined set of the other IP network nodes, wherein the request comprises the pre-stored node certificate,
  upon reception of an acceptance response to the request from at least one of the IP network nodes in the predetermined set of the other IP network nodes, determining whether a node certificate in the acceptance response is valid, wherein the node certificate in the acceptance response is associated to the responding IP network node, and
  establishing the IPSec relationship if the node certificate associated to the responding IP network node is valid.

The step of determining whether the node certificate associated to the responding IP network node is valid comprises in one option validating that a presented identity according to the node certificate associated to the responding node is signed by an acceptable Certificate Authority (CA) based on a pre-stored root certificate of the acceptable Certificate Authority (CA). Validating a node's identity by the use of root certificate(s) makes it possible to authenticate multiple IP nodes without the need of storing individual identity information of the other nodes in each node. The use of root certificate(s) also adds the possibility to authenticate nodes that were non-existing during initial setup, such that new IP nodes and IPSec relations can be added to a network without adding extra information in the existing nodes forming the network.

The step of determining whether the node certificate associated to the responding IP network node is valid comprises in one option verifying that the node certificate associated to the responding node is not invalidated by a Certificate Revocation List.

In one option, the method performed at an IP network node for IPSec establishment with other IP network nodes in a network, comprises the steps of
- receiving a request for establishment of an IPSec relationship from one of the other IP network nodes, wherein the request comprises a pre-stored node certificate of the requesting node,
- determining whether the request is to be granted, comprising determining whether the node certificate in the request is valid, and
- sending an acceptance response comprising an own node certificate to the requesting node if the request is to be granted.

The step of determining whether the node certificate associated to the requesting node is valid may comprise validating that a presented identity according the node certificate associated to the requesting node is signed by an acceptable CA based on a pre-stored root certificate of the acceptable Certificate Authority (CA). As stated above, validating an IP node's identity by the use of root certificate(s) makes it possible to authenticate multiple IP nodes without the need of storing individual identity information of the other IP nodes in each IP node. The use of root certificate(s) also adds the possibility to authenticate IP nodes that were non-existing during initial setup, such that new nodes and IPsec relations can be added to a network without adding extra information in the existing IP nodes forming the network.

The step of determining whether the node certificate associated to the requesting node is valid may comprise verifying that the node certificate associated to the requesting node is not invalidated by a Certificate Revocation List.

The step of determining whether the request is to be granted may comprise determining whether the origin of the received request is a node belonging to the predetermined set of the other IP network nodes.

In one option, the predetermined set of the other IP network nodes comprises IP network nodes to a predetermined depth in a routing hierarchy. In one example, the predetermined depth is one, i.e. the IPSec relationship is established with the neighbouring IP network nodes. This reduces the number of IPsec relations created to only include the neighboring IP nodes, which is beneficial in large networks from a hardware processing perspective.

In one option, the predetermined set of the other IP network nodes is determined by a table accessible by the IP network node. Thereby, IPsec relations can be formed with a certain set of IP nodes in a network independent of their IP address(es) and/or location in the network.

One embodiment of the present invention relates to an IP network node for an IP network. The IP network node comprises a dynamic routing protocol database comprising information about other nodes in the IP network, the information comprising an IP address associated to the respective other nodes, a memory for node certificate information, said node certificate information comprising a pre-stored node certificate, and processing means for establishing an IPSec relationship with a predetermined set of the other nodes in the network based on the information in the dynamic routing protocol database. The processing means for establishing an IPSec relationship are arranged to establish the IPSec relationship based on Internet Key Exchange (IKE) using a certification protocol and the identity of the node, wherein the identity of the node is determined by the pre-stored node certificate.

In one option, the pre-stored node certificate is signed by an acceptable Certificate Authority (CA).

In one option, the memory for node certificate information further comprises a pre-stored root certificate for the acceptable CA.

In one option, the memory for node certificate information further comprises a Certificate Revocation List or a Uniform Resource Locator, URL, to a Certificate Revocation List.

In one option, the IP network node comprises information related to a set mode for allowing establishment of IPSec relationships. The means for establishing an IPSec relationship may then be arranged to only establish IPSec relationships to other nodes operating in the same mode.

In one option, IPSec relations established according to a predetermined routing hierarchy level are allowed in the set mode.

In one option, IPSec relations established in accordance with a relation table stored in or accessed by the node are allowed in the set mode.

One embodiment of the present invention relates to a radio base station comprising an IP node for an IP network according to the above.

One embodiment of the present invention relates to a network comprising a plurality of IP network nodes according to the above.

In one option, the network is a Self Organizing Network. One advantage is that when deploying IP nodes forming Self Organizing Networks, the nodes might negotiate the IP addresses automatically. Thus, the IP addresses of the IP nodes may not be known in advance.

One embodiment of the present invention relates to a computer program, comprising computer readable code which, when run on a programmable network node, causes the programmable network node to perform a method according to the above.

In one option, the computer program is carried on a carrier medium.

One embodiment of the present invention relates to a recording medium storing computer readable code according to the above.

One embodiment of the present invention relates to an IP network node having installed thereon the computer program in accordance with the above.

DETAILED DESCRIPTION

Figure 1:
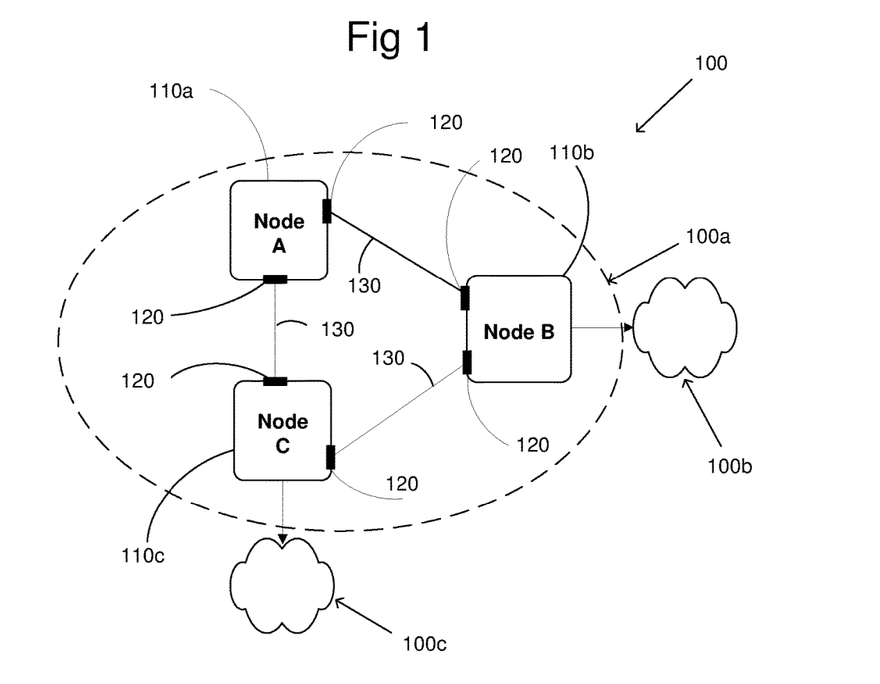
FIG. 1 shows schematically a first example of a system comprising a plurality of networks each comprising a plurality of IP network nodes.

In FIG. 1, a system 100 comprises a plurality of networks 100*a*, 100*b*, 100*c*. One or a plurality of the networks 100*a*, 100*b*, 100*c* also makes use of a dynamic routing protocol for routing. In one example the dynamic routing protocol is an Interior Gateway Protocol (IGP). One or a plurality of the networks 100*a*, 100*b*, 100*c* is further arranged to make use of a public key infrastructure (PKI). One or a plurality of the networks may also be arranged to make use of an Internet Key Exchange (IKE) protocol.

In the example of FIG. 1, a first network 100*a* comprises a plurality of IP network nodes 110*a*, 110*b*, 110*c*. The IP network nodes 110*a*, 110*b*, 110*c* in the first network are each running a dynamic routing protocol for routing, such as an Interior Gateway Protocol (IGP). The respective IP network node is arranged to provide the IP address of other nodes and/or the IP address of their interfaces with a routing domain, such as the IGP routing domain, using the dynamic routing protocol.

The IGP has a Routing Information Base (RIB) accessible by the respective IP network node. The Routing information Base is arranged to store all IP Routing information. The RIB is not specific to any routing protocol. Rather, all routing protocols place all of their routes in the RIB. The IGP may further have a Neighbor Database. The IGP routing protocol is for example OSPF or IS-IS.

Further, the IP network nodes each have Internet Key Exchange (IKE) support. The IP network nodes also each support IPsec.

The IP network nodes also each have individual node certificates. The individual node certificates are issued by a Certificate Authority (CA) of a public key infrastructure (PKI). The individual node certificates are signed by the CA. Further, the respective IP network node also has access to or installed one or a plurality of root certificates of the authorized CA(s). Thereby the IP network node is able to verify the correctness of the individual certificates of the own IP network node and other IP network nodes. The individual node certificate is for example X.509v3. The node and root certificates are for example pre-loaded onto the node in factory during production, during pre-deployment preparations, or they can be fetched during deployment using a certificate enrolment protocol. The certificate enrolment protocol is for example CMPv2 or SCEP. The nodes may also have an IPsec relationship data structure installed. This will be described more in detail below.

In the illustrated example of FIG. 1, a first IP network node 110*a* has an IP security (IPsec) relationship 130 established to a second IP network node 110*b*. The first IP network node 110*a* also has an IP security (IPSec) relationship 130 established to a third IP network node 110*c*. Further, the second IP network node 110*b* has an IPSec relationship 130 established to the third IP network node 110*c*. The IPsec relationships 130 are established between the IP network nodes via an interface 120 in the respective IP network node. Further, the second IP network node 110*b* knows a path to a second network 100*a*. The third IP network node 110*c* knows a path to a third network 110*b*.

Figure 2:
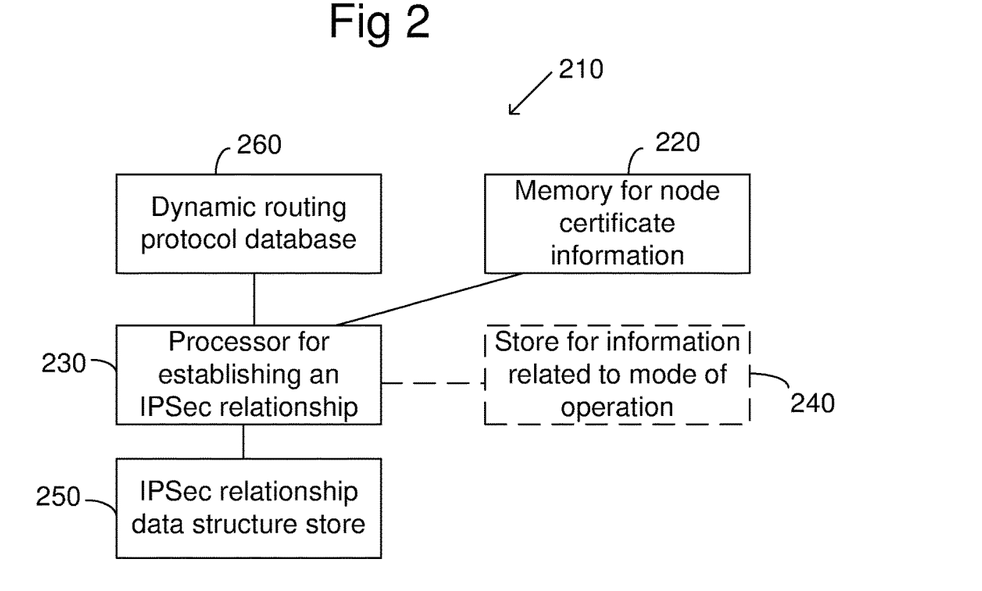
FIG. 2 shows a schematic first example of an IP network node.

In FIG. 2, an IP network node 210 for an IP network is arranged to operate so as to collect information about the other IP network nodes in the network using a dynamic routing protocol, wherein the information comprises an IP address associated with the respective other IP network node, and to establish an IPSec relationship with a predetermined set of the other IP network nodes in the network based on the collected information and based on Internet Key Exchange (IKE) using a certification protocol and the identity of the IP network node, wherein the identity of the IP network node is determined by a pre-stored node certificate.

The IP network node 210 comprises in the illustrated example a dynamic routing protocol database 260, a memory 220 for node certificate information, a processor 230 for establishing an IPsec relationship with the predetermined set of the other nodes in the network, and an optional store 250 for an IPsec relationship data structure. The IP network node comprises an optional store 240 for information related to a mode of operation.

The dynamic routing protocol database 260 comprises information about other nodes in the IP network. The information about the other nodes comprises an IP address associated to the respective other nodes.

The node certificate information of memory 220 comprises a pre-stored node certificate. The pre-stored node certificate is in one example signed by an acceptable Certificate Authority (CA). The memory 220 for node certificate information further comprises in one example a pre-stored root certificate for the acceptable CA. The memory 220 for node certificate information comprises in one example a Certificate Revocation List or a Uniform Resource Locator, URL, to a Certificate Revocation List.

The processor 230 is arranged to establish the IPSec relationship with the predetermined set of the other nodes in the network based on the information in the dynamic routing protocol database and based on Internet Key Exchange (IKE) using a certification protocol and the identity of the node, wherein the identity of the node is determined by the pre-stored node certificate.

The optional store 240 for information related to a mode of operation is arranged to comprise information related to a set mode for allowing establishment of IPSec relationships. The processor 230 for establishing an IPSec relationship are then in one example arranged to only establish IPSec relationships to other nodes operating in the same mode. In one example, in the set mode, IPSec relations established according to a predetermined routing hierarchy level are allowed. In one example, in the set mode, IPSec relations established in accordance with a relation table are allowed. The relation table is stored in the store 240 for information related to the mode of operation or accessible for the node in any other way.

Figure 3:
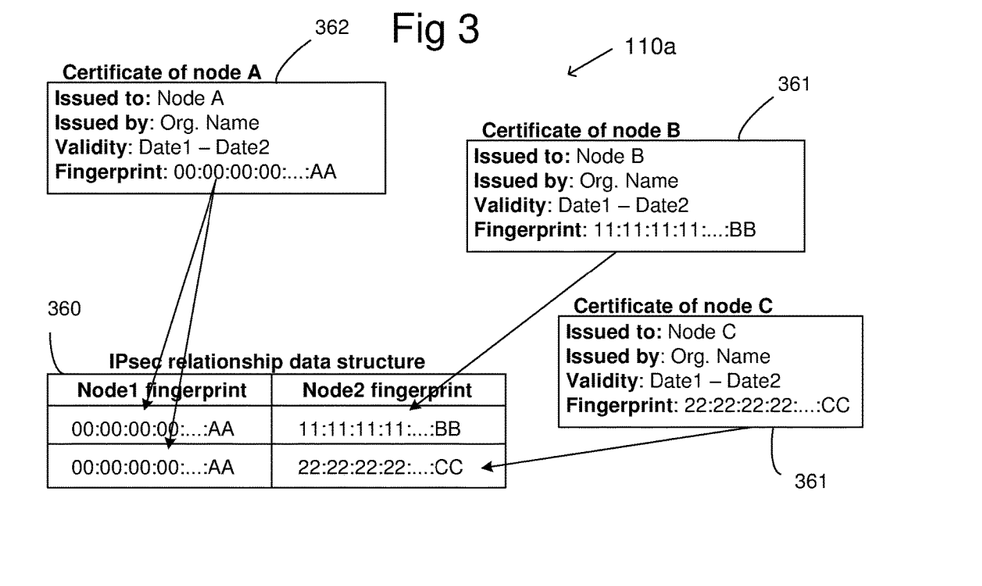
FIG. 3 shows a schematic example of an IP Security (IPsec) relationship data structure.

In FIG. 3, one example of an IP network node relationship data structure 360 of a first IP network node 110*a* is illustrated. The IP network node relationship data structure 360 identifies a predetermined set of the other IP network nodes in the network to which the first IP network node should form an IPsec relation with. The predetermined set of the other IP network nodes depends on the mode of operation of the node. In the illustrated example, the IP network node relationship data structure 360 comprises a table identifying the predetermined set of the other IP network nodes based on node certificate information 361 associated to the respective other IP network node. In the illustrated example, the IP network node relationship data structure 360 comprises a fingerprint comprised in the node certificate information 361 associated to the respective other IP network node. The table also comprises a fingerprint comprised in node certificate information 362 associated to the first IP network node 362. Such a table may be common to the entire network. The node certificates of the first IP network node 110*a* and/or the predetermined set of other IP network nodes comprise in one example also information related to the identity of the node to which the certificate has been issued and/or the Certificate Authority which has issued the certificate and/or information related to timing of the validity of the certificate. For example, the timing of the validity is indicated by a start date and an end date for the validity.

Figure 4:
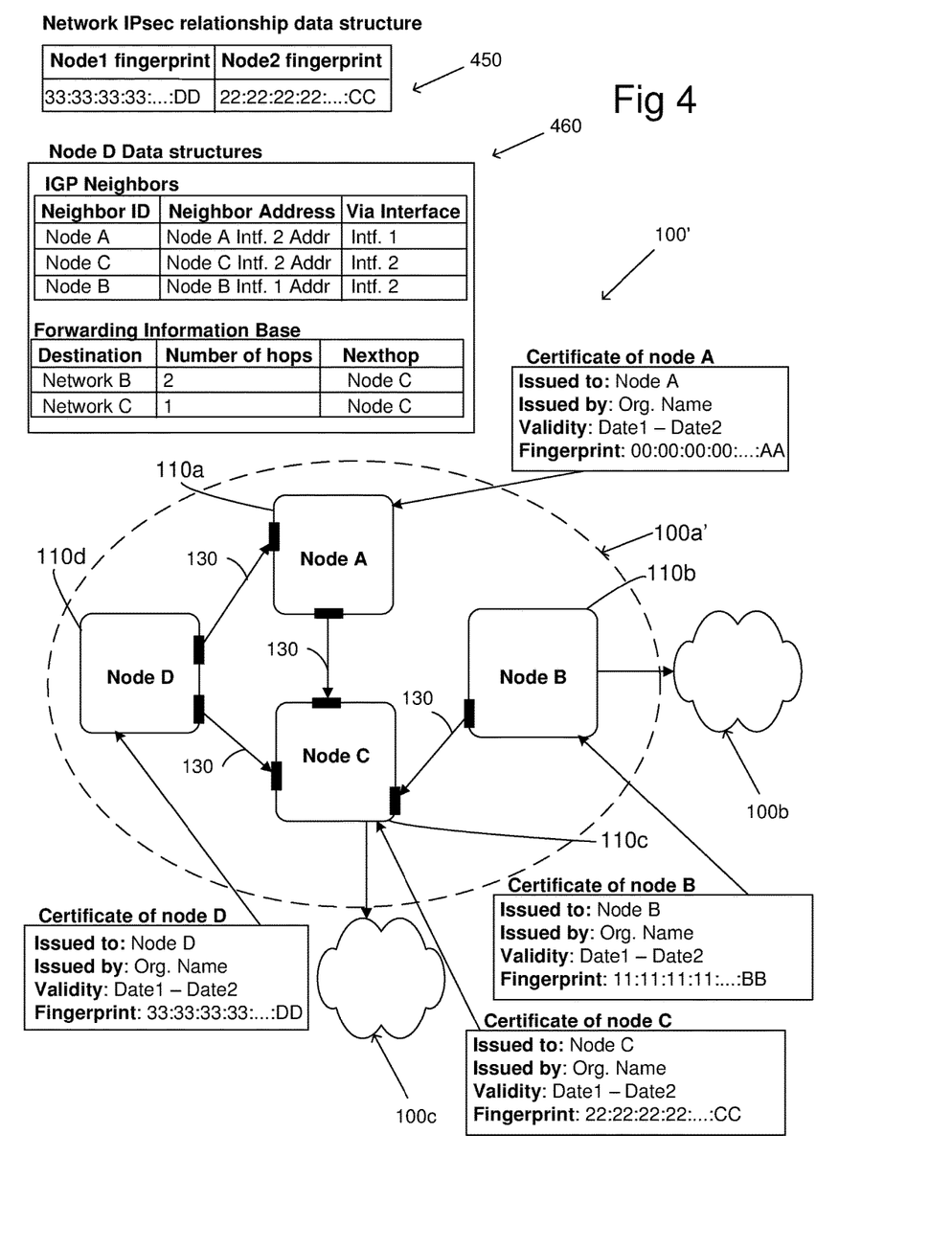
FIG. 4 shows schematically a second example of a system comprising a plurality of networks each comprising a plurality of IP network nodes together with a second schematic example of an IP Security (IPsec) relationship data structure.

In FIG. 4, a system 100' comprises a plurality of networks 100*a*', 100*b*, 100*c*, as described in relation to FIG. 1. One or a plurality of the networks 100*a*', 100*b*, 100*c* makes use of a dynamic routing protocol for routing, as discussed in relation to FIG. 1. One or a plurality of the networks 100*a*', 100*b*, 100*c* is further arranged to make use of a public key infrastructure (PKI) and an Internet Key Exchange (IKE) protocol, as discussed in relation to FIG. 1.

In the example of FIG. 4, a first network 100*a*' comprises a plurality of IP network nodes 110*a*, 110*b*, 110*c*, 110*d*. The IP network nodes 110*a*, 110*b*, 110*c*, 110*d* in the first network are each running a dynamic routing protocol for routing, such as an Interior Gateway Protocol (IGP). The respective IP network node is arranged to provide the IP address of other nodes and/or the IP address of their interfaces with the routing domain, such as the IGP routing domain, using the IGP.

The IGP has a Routing Information Base (RIB) accessible by the respective IP network node. The Routing information Base is arranged to store all IP Routing information. The RIB is not specific to any routing protocol. Rather, all routing protocols place all of their routes in the RIB. The IGP may further have a Neighbor Database. The IGP routing protocol is for example OSPF or IS-IS.

Further, the IP network nodes each have Internet Key Exchange (IKE) support. The IP network nodes also each support IPsec.

The IP network nodes also each have individual node certificates. The individual node certificates are issued by a Certificate Authority (CA) of a public key infrastructure (PKI). The individual node certificates are signed by the CA. Further, the respective IP network node also has access to or installed one or a plurality of root certificates of the CA (not shown). Thereby the IP network node is able to verify the correctness of the individual certificates of the own IP network node and other IP network nodes. The individual node certificate is for example X.509v3. The node and root certificates are for example pre-loaded onto the node in factory during production, during pre-deployment preparations, or they can be fetched during deployment using a certificate enrollment protocol. The certificate enrolment protocol is for example CMPv2 or SCEP. The nodes in the illustrated example also have an IPsec relationship data structure installed. This will be described more in detail below.

In the illustrated example of FIG. 4, an IPsec relation table 450 establishes an IPsec relationship between node D 110*d* and node C 110*c*. In an alternatvie example wherein the IP nodes are not operating in a mode wherein they use the relation table to form IPsec relations, first IP network node 110*a* has an IP security (IPSec) relationship established to a third and a fourth IP network node 110*c*, 110*d*. Further, a second IP network node 110*b* has an IPSec relationship established to the third IP network node 110*c*. Further, the third IP network node 110*c* has an IPSec relationship established to the fourth IP network node 110*d*. The IPsec relationships 130 are established between the IP network nodes via an interface in the respective IP network node. Further, the second IP network node 110*b* knows a path to a second network 100*a*. The third IP network node 110*c* knows a path to a third network 110*b*.

At least one of the IP network nodes 110*a*, 110*b*, 110*c*, 110*d* has an IPsec relationship data structure 450, as discussed in relation to FIG. 3. Further, at least one of the IP network nodes 110*a*, 110*b*, 110*c*, 110*d* has a dynamic routing protocol database 260 associated to the IP network node. In the illustrated example, the dynamic routing protocol database comprises a table identifying the neighbours to an IP network node along with their addresses and/or the addresses of their interfaces. The addresses are IP addresses. In the Illustrated example the dynamic routing protocol database 260 comprises a table identifying the IGP neighbours, wherein a first column indicates an identity of the respective neighbour, the second column indicates an address associated to the respective neighbour and a third column indicates via which interface in the IP network node the respective neighbour is accessed. In the illustrated example, the dynamic routing protocol database 260 further comprises a Forwarding Information Base (FIB) indicating the path to other networks. In the illustrated example the path to the respective network is indicated by the number of hops to the respective other network is reached.

In operation, when the dynamic routing protocol, such as IGP, has settled negotiations and a neighbour table, such as an IGP neighbour table, is provided, IKE sessions towards all neighbour addresses in the neighbour table are initiated. During the IKE negotiation the nodes exchange their node certificates. Depending on a chosen mode for establishing IPsec relations, it is also decided which IP network nodes to establish IPsec relationships with. After deciding which nodes to form IPsec relationships with the IKE negotiation continues, using the root certificate of the CA to validate that the presented node certificates are valid. The information in the FIB can then be used to populate IPsec relations' traffic selectors, which decides what traffic to put into each relation (tunnel). In this illustrated example Node D 110*d* would put traffic destined for networks 110*b* and 100*c* in the IPsec relation created between Node D 110*d* and Node C 110*c*.

Figure 5:
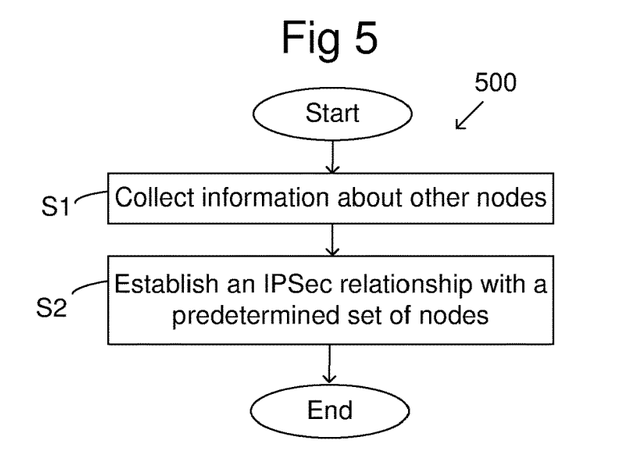
FIG. 5 shows a flow chart illustrating an example of a method performed at an IP network node for IPSec establishment with other IP network nodes in a network.

In FIG. 5, a method 500 for IPSec establishment between a first IP network node and other IP network nodes in a network comprises:

collecting S1 at the first IP network node information about the other IP network nodes in the network using a dynamic routing protocol, the information comprising an IP address associated with the respective other IP network node, and establishing S2 an IPSec relationship between the first IP network node and a predetermined set of the other IP network nodes in the network based on the collected information and based on Internet Key Exchange (IKE) using a certification protocol and the identity of the first IP network node, wherein the identity of the first IP network node is determined by a pre-stored node certificate.

The dynamic routing protocol is in one example an Interior Gateway Protocol (IGP). The information about the respective other IP network node comprises the IP address of the other IP network node itself and/or an interface associated thereto.

The predetermined set of the other IP network nodes comprises in one example IP network nodes to a predetermined depth in a routing hierarchy. In an example wherein the predetermined depth is one, the IPSec relationship is established with the neighbouring IP network nodes. In one example, the predetermined set of the other IP network nodes is determined by a table accessible by the IP network node.

Figure 6:
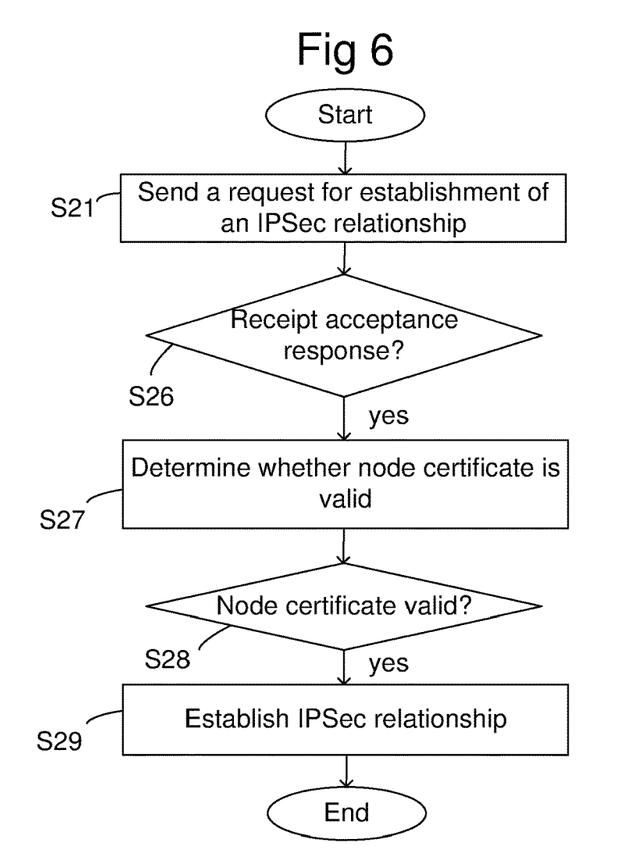
FIG. 6 is a flow chart illustrating an example of a step of establishing an IPSec relationship in a method performed at a requesting IP network node for IPsec establishment with other IP network nodes in a network.

In FIG. 6, a step of establishing an IPSec relationship comprises performing the following steps at the first IP network node:

sending S21 a request for establishment of an IPSec relationship to at least one of the IP network nodes in the predetermined set of the other IP network nodes, wherein the request comprises the pre-stored node certificate, await receipt S26 of an acceptance response to the request from at least one of the IP network nodes in the predetermined set of the other IP network nodes, upon reception of such acceptance response determine S27 whether a node certificate in the acceptance response is valid, wherein the node certificate in the acceptance response is associated to the responding IP network node, and establishing S29 the IPSec relationship if the node certificate associated to the responding IP network node is determined to be valid S28.

The step of determining S27 whether the node certificate associated to the responding IP network node is valid comprises in one example validating that a presented identity according to the node certificate associated to the responding node is signed by an acceptable Certificate Authority (CA) based on a pre-stored root certificate of the acceptable Certificate Authority (CA).

The step of determining S27 whether the node certificate associated to the responding IP network node is valid comprises in one example verifying that the node certificate associated to the responding node is not invalidated by a Certificate Revocation List.

Figure 7:
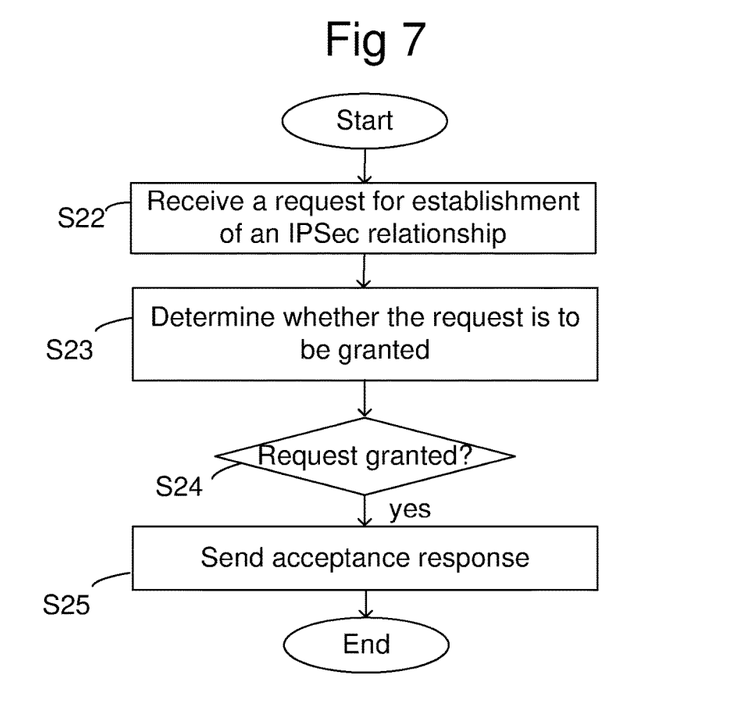
FIG. 7 is a flow chart illustrating an example of a step of establishing an IPSec relationship performed at a responding IP network node.

In FIG. 7, a step of establishing an IPSec relationship comprises performing the following steps at a responding IP network node:

receiving S22 a request for establishment of an IPSec relationship from one of the other IP network nodes, wherein the request comprises a pre-stored node certificate of the requesting node, determining S23 whether the request is to be granted, comprising determining whether the node certificate in the request is valid, and sending S25 an acceptance response comprising an own node certificate to the requesting node if the request is to be granted.

The step of determining S23 whether the node certificate associated to the requesting node is valid comprises in one example validating that a presented identity according the node certificate associated to the requesting node is signed by an acceptable CA based on a pre-stored root certificate of the acceptable Certificate Authority (CA).

The step of determining S23 whether the node certificate associated to the requesting node is valid comprises in one example verifying that the node certificate associated to the requesting node is not invalidated by a Certificate Revocation List.

The step of determining S23 whether the request is to be granted comprises in one example determining whether the origin of the received request is a node belonging to the predetermined set of the other IP network nodes.

Figure 8:
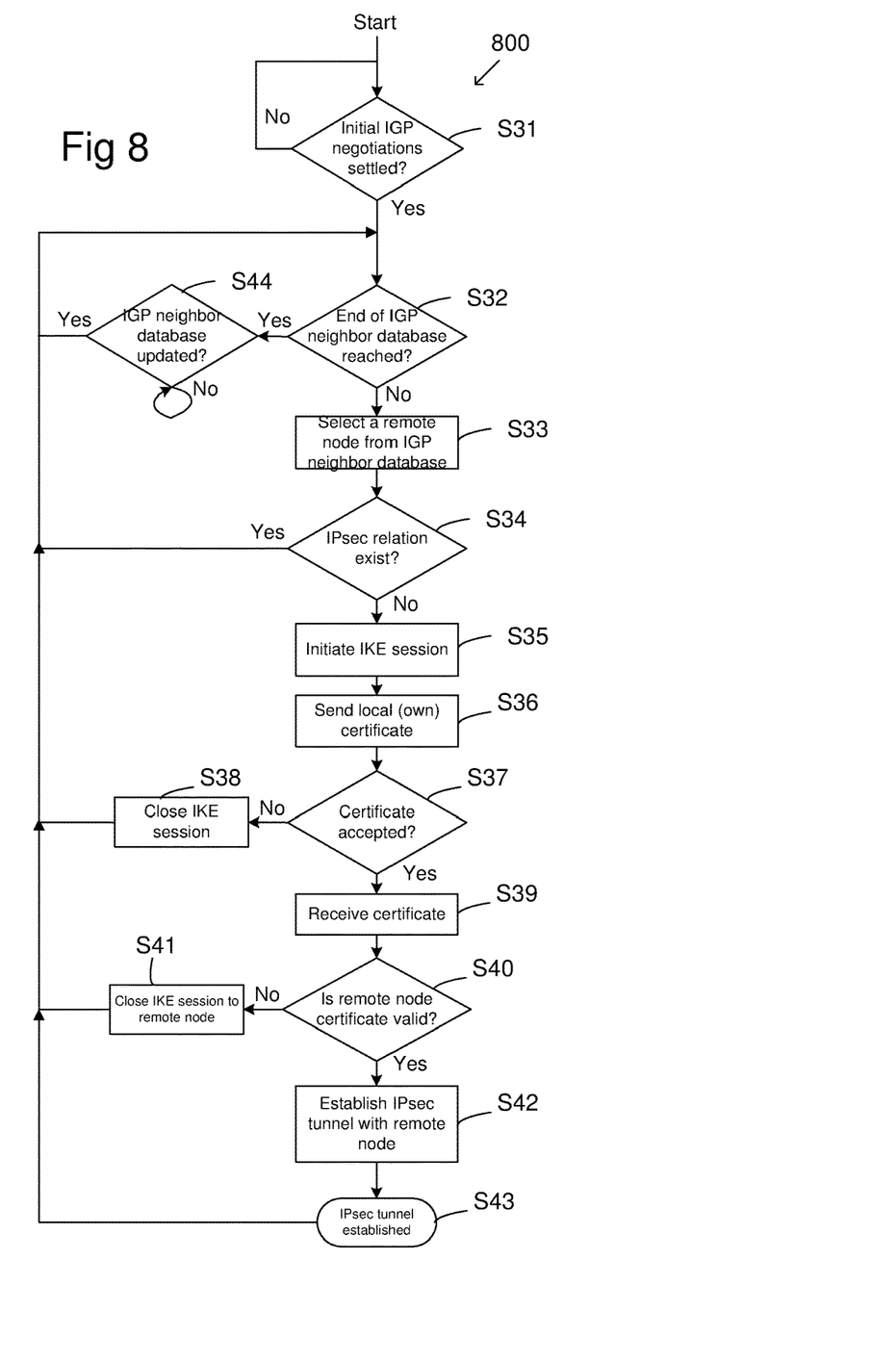
FIG. 8 is a flow chart illustrating a detailed example of a client process running on the respective IP network node in an IP network.

In FIG. 8, a flow chart presents a client process 800 running on the respective node in an example wherein IPsec relationships are established using a dynamic routing protocol in the form of IGP. In a first step s31, it is determined whether initial IGP negotiations have been settled. If not, settlement of initial IGP negotiations is awaited. If initial IGP negotiations have been settled, it is determined whether the end of an IGP neighbour database has been reached s32.

If the end of the IGP neighbour database has been reached, an update of the IGP neighbour database is awaited s44. When updated, the process jumps back to step s32. If on the other hand, the end of IGP neighbour database has not been reached s32, a remote node is selected s33 from the IGP neighbour database. Then, it is determined s34 whether an IPsec relation already exists with the selected remote node. If so, the process returns to step s32. If an IPsec relation does not already exist, IKE session with the selected remote node is initiated s35. Thereafter a local (i.e. the own) node certificate is sent s36 to the selected remote node. Thereafter it is determined s37 whether the selected remote node accepts the local (own) node certificate. If not, the IKE session to the selected remote node is closed s38. Thereafter the process jumps back to step s32. If on the other hand the selected remote node accepts the local (own) node certificate, the node certificate of the selected remote node is received s39.

Thereafter it is determined s40 whether the node certificate of the selected remote node is valid. In one example it is determined whether the node certificate of the selected remote node is valid based on a root certificate associated to a certifying authority (CA) authorized to certify node certificates for the nodes in the network. The root certificate is stored in or accessible to the local (own) node. If the node certificate of the selected remote node is determined not to be valid, the IKE session to the selected remote node is closed s41. Thereafter the process jumps back to step s32. If on the other hand the node certificate of the selected remote node is determined to be valid, a process for establishing an IPsec tunnel with the selected remote node is performed s42. The process may involve using FIB to negotiate traffic selectors. Thereafter, an IPsec tunnel is established s43. Thereafter the process jumps back to step s32.

Figure 9:
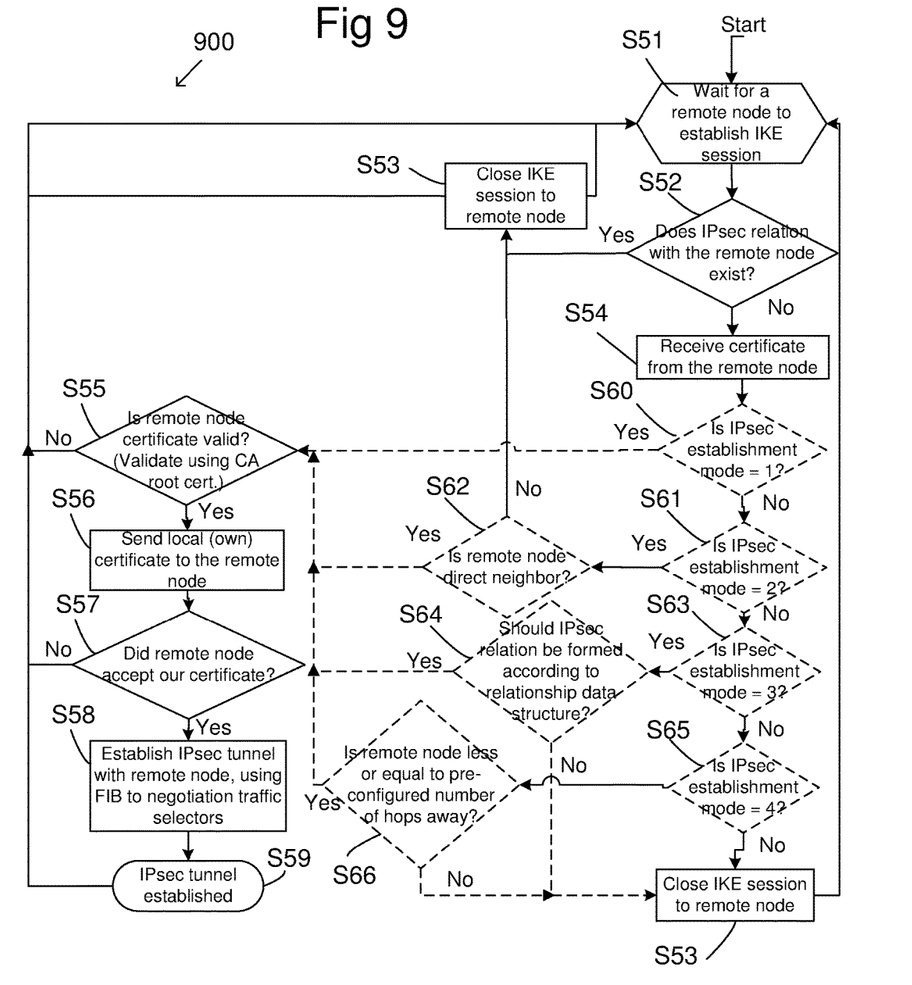
FIG. 9 is a flow chart illustrating a detailed example of a server process running on the respective IP network node in an IP network.

In FIG. 9, a flow chart presents a server process 900 running on the respective node in an example wherein IPsec relationships are established using a dynamic routing protocol in the form of IGP. The server process 900 comprises waiting s51 for a remote node to establish IKE session. When a remote node has established an IKE session, it is determined s52 if an IPsec relation with the remote node already exists. In one example this is performed by comparing the IP address of the node to which the IKE session is established with a locally stored IP address associated to remote nodes to which an IPsec relation has been established. If an IPsec relation with the node establishing the IKE session already exists, the IKE session to the remote node is closed s53. If on the other hand, an IPsec relation with the node establishing the IKE session does not exist, a node certificate associated to the node establishing the IKE session is received s54.

Thereafter, it is determined s55 whether the node certificate of the remote node is valid. In one example, it is determined whether the node certificate of the remote node is valid based on a root certificate associated to a certifying authority (CA) authorized to certify node certificates for the nodes in the network. The root certificate is stored in or accessible to the local, server (own) node. If the node certificate of the selected remote node is determined not to be valid, the IKE session to the selected remote node is closed s53. Thereafter the process jumps back to step s51. If on the other hand the node certificate of the selected remote node is determined to be valid, the local, server (own) node certificate is sent s56 to the remote node. Thereafter it is determined s57 whether the remote node has accepted the sent certificate. If the remote node has not accepted the sent node certificate, the IKE session is closed s53 and the process jumps back to step s51. If on the other hand, the remote node has accepted the sent node certificate, a process for establishing an IPsec tunnel with the selected remote node is performed s58. The process may involve using FIB to negotiate traffic selectors. Thereafter, an IPsec tunnel is established s59. Thereafter the process jumps back to step s51.

The process described above operates in accordance with a first mode of operation, wherein each node in the routing domain is allowed to establish IPsec relationships to any node in the network. This mode requires no prior configuration.

In one extended example, it is determined in a step s60 whether the process is operating in accordance with the first mode of operation, in which case the process jumps from step s54 to step s55.

In one extended example, it is determined in a step s61 whether the process is operating in accordance with a second mode of operation. In the second mode of operation, IPsec relationships are only established to neighbouring nodes. If the process is determined to operate in accordance with this second mode of operation, it is determined s62 whether the remote node is a direct neighbour. If not, the IKE session to the remote node is closed s53. If on the other hand the remote node is a direct neighbour, the process jumps to step s55. No prior configuration of the node is required.

In one extended example, it is determined in a step s63 whether the process is operating in accordance with a third mode of operation. In the third mode of operation, IPsec relationships are only established to other nodes in accordance with a relationship table comprised in a store for information related to mode of operation. If the process is determined to operate in accordance with this third mode, it is determined s64 whether the remote node is comprised in the relationship table. If not, the IKE session to the remote node is closed s53. If on the other hand the remote node comprised in the relationship table, the process jumps to step s55. The node is in accordance with this example either pre-loaded with the relationship table or the relationship table is fetched during deployment.

In one extended example, it is determined in a step s65 whether the process is operating in accordance with a fourth mode of operation. In the fourth mode of operation, IPsec relationships are only established to nodes less than or equal to a pre-configured number of hops away. If the process is determined to operate in accordance with this fourth mode of operation, it is determined s66 whether the remote node is less than or equal to a pre-configured number of hops away. If not, the IKE session to the remote node is closed s53. If on the other hand the remote node is less than or equal to a pre-configured number of hops away, the process jumps to step s55. Thus, in this fourth mode of operation, the nodes are let to establish IPsec relationships to a certain depth in the routing hierarchy, e.g. establishing IPsec relations with nodes that are at maximum three hops away. The node is in accordance with this example pre-configured with information related to the depth to use.

In one example, the own node is arranged to receive information from the remote nodes related to the option in which they operate and to compare the option to the option in which the own node operate. In one example, IPsec relationships are accepted to remote nodes operating in accordance with the same option as the own node (not shown).

In the first and second modes of operations, only a dynamic routing protocol, such as IGP, and a node certificate and a CA root certificate are pre-loaded in the nodes to form an IPsec relation between two nodes.

The invention claimed is:

1. A method performed at an Internet Protocol (IP) network node for IP Security (IPSec) establishment with other IP network nodes in a network, the method comprising:
    collecting information about the other IP network nodes in the network using a dynamic routing protocol, the information comprising an IP address associated with the respective other IP network node;
    establishing an IPSec relationship with a predetermined set of the other IP network nodes in the network based on the collected information and based on Internet Key Exchange (IKE) using a certification protocol and the identity of the IP network node;
    wherein:
        the identity of the IP network node is determined by a pre-stored node certificate; and
        the predetermined set of the other IP network nodes comprises IP network nodes of a predetermined depth in a routing hierarchy.

2. A method according to claim 1, wherein the dynamic routing protocol is an Interior Gateway Protocol (IGP).

3. A method according to claim 1, wherein information about the respective other IP network node comprises the IP address of the other IP network node or an interface associated thereto.

4. A method according to claim 1, wherein the step of establishing the IPSec relationship comprises
    sending a request for establishment of an IPSec relationship to at least one of the IP network nodes in the predetermined set of the other IP network nodes, wherein the request comprises the pre-stored node certificate,
    upon reception of an acceptance response to the request from at least one of the IP network nodes in the predetermined set of the other IP network nodes, determining whether a node certificate in the acceptance response is valid, wherein the node certificate in the acceptance response is associated to the responding IP network node, and establishing the IPSec relationship if the node certificate associated to the responding IP network node is valid.

5. A method according to claim 4, wherein the step of determining whether the node certificate associated to the responding IP network node is valid comprises validating that a presented identity according to the node certificate associated to the responding node is signed by an acceptable Certificate Authority (CA) based on a pre-stored root certificate of the acceptable Certificate Authority (CA).

6. A method according to claim 4, wherein the step of determining whether the node certificate associated to the responding IP network node is valid comprises verifying that the node certificate associated to the responding node is not invalidated by a Certificate Revocation List.

7. A method according to claim 1, comprising the steps of
receiving a request for establishment of an IPSec relationship from one of the other IP network nodes, wherein the request comprises a pre-stored node certificate of the requesting node,
determining whether the request is to be granted, comprising determining whether the node certificate in the request is valid, and
sending an acceptance response comprising an own node certificate to the requesting node if the request is to be granted.

8. A method according to claim 7, wherein determining whether the node certificate associated to the requesting node is valid comprises validating that a presented identity according the node certificate associated to the requesting node is signed by an acceptable certificate authority (CA) based on a pre-stored root certificate of the acceptable CA.

9. A method according to claim 7, wherein the step of determining whether the node certificate associated to the requesting node is valid comprises verifying that the node certificate associated to the requesting node is not invalidated by a Certificate Revocation List.

10. A method according to claim 7, wherein the step of determining whether the request is to be granted comprises determining whether the origin of the received request is a node belonging to the predetermined set of the other IP network nodes.

11. A method according to claim 1, wherein the predetermined depth is one, such that the IPSec relationship is established with neighboring IP network nodes.

12. A method according to claim 1 wherein the predetermined set of the other IP network nodes is determined by a relation table accessible by the IP network node.

13. An Internet Protocol (IP) network node for an IP network, said IP network node comprising:

a dynamic routing protocol database comprising information about other nodes in the IP network, the information comprising an IP address associated to the respective other nodes, a memory for node certificate information, said node certificate information comprising a pre-stored node certificate, and one or more processors for establishing an IP Security (IPSec) relationship with a predetermined set of the other nodes in the network based on the information in the dynamic routing protocol database, characterized in that the one or more processors for establishing an IPSec relationship are arranged to establish the IPSec relationship based on Internet Key Exchange (IKE) using a certification protocol and the identity of the node, wherein the identity of the node is determined by the pre-stored node certificate;

wherein:
the IP network node comprises information related to a set mode for allowing establishment of IPSec relationships, the set mode comprising IPSec relations established according to a predetermined routing hierarchy level;

and the one or more processors for establishing an IPSec relationship are arranged to only establish IPSec relationships to other nodes operating in the same mode.

14. An IP network node according to claim 13, wherein the pre-stored node certificate is signed by an acceptable Certificate Authority (CA).

15. An IP network node according to claim 14, wherein the memory for node certificate information further comprises a pre-stored root certificate for the acceptable CA.

16. An IP network node according to claim 13, wherein the memory for node certificate information further comprises a Certificate Revocation List or a Uniform Resource Locator, URL, to a Certificate Revocation List.

17. An IP network node according to claim 13, wherein in the set mode IPSec relations comprise a relation table stored in or accessed by the node.

18. A radio base station comprising an IP node for an IP network according to claim 13.

19. A network comprising a plurality of IP network nodes according to claim 13.

20. A network according to claim 19, wherein the network is a Self Organizing Network.

21. A computer program product comprising instructions stored on non-transient computer-readable media which, when executed by a processor, perform the steps of claim 1.

* * * * *